A. BEIJER.
POWER TRANSMISSION AND CONTROL.
APPLICATION FILED MAY 19, 1913.
1,189,042.
Patented June 27, 1916.
2 SHEETS—SHEET 1.
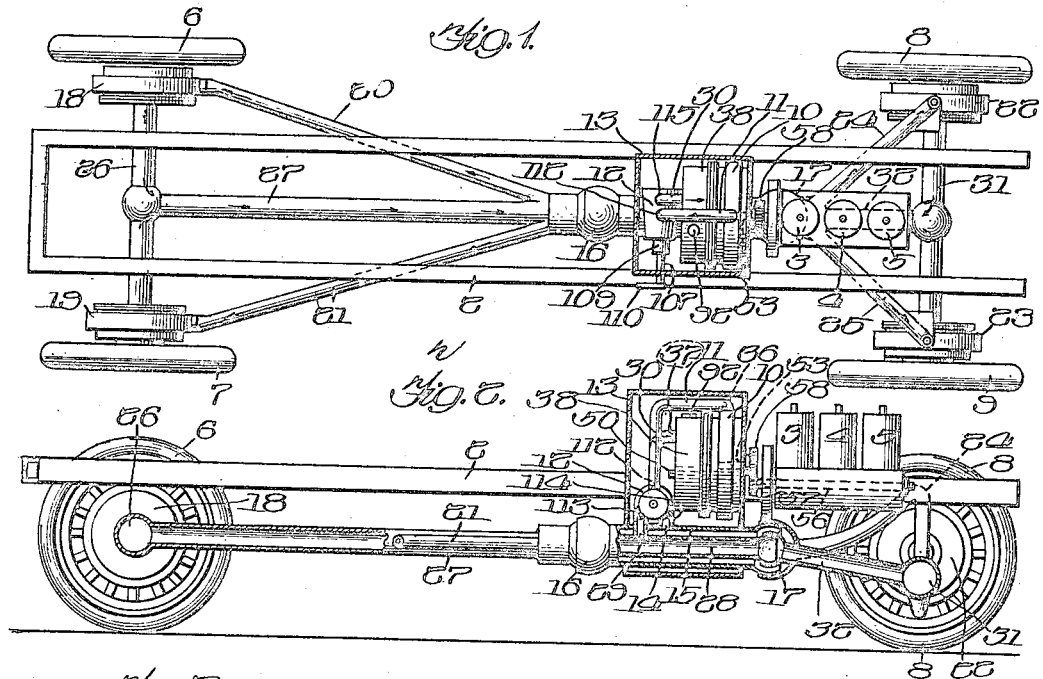
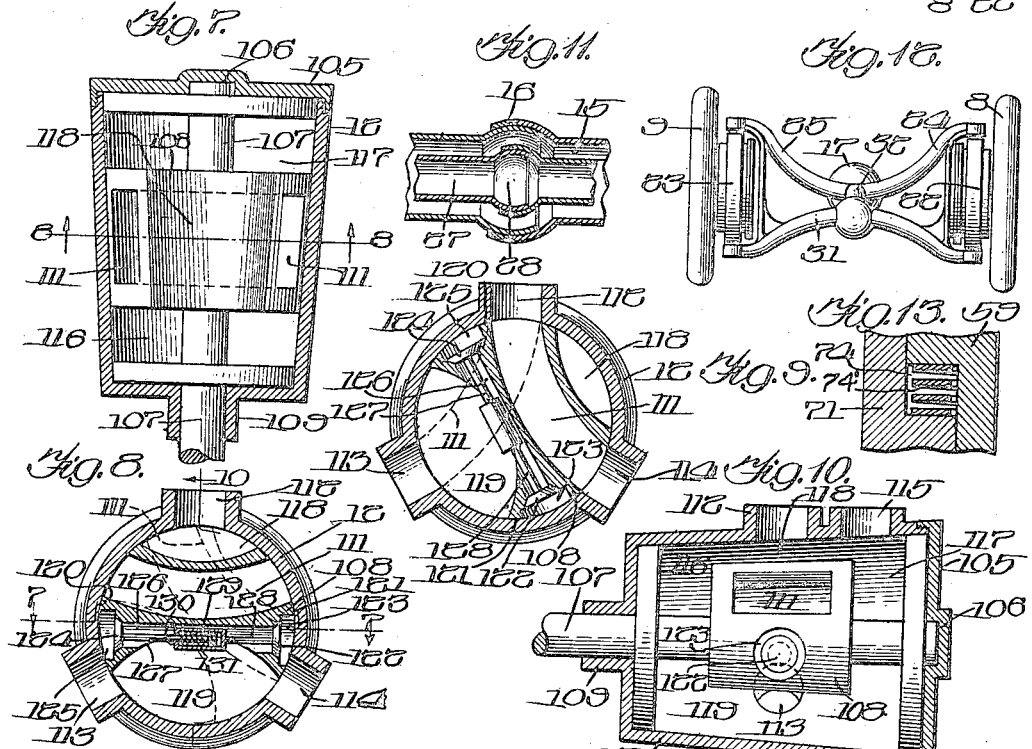
Witnesses
Inventor:
ARTHUR BEIJER

A. BEIJER.
POWER TRANSMISSION AND CONTROL.
APPLICATION FILED MAY 19, 1913.

1,189,042.

Patented June 27, 1916.
2 SHEETS—SHEET 2.

Witnesses:

Inventor:
ARTHUR BEIJER

UNITED STATES PATENT OFFICE.

ARTHUR BEIJER, OF STEVENS POINT, WISCONSIN.

POWER TRANSMISSION AND CONTROL.

1,189,042.  Specification of Letters Patent.  Patented June 27, 1916.

Application filed May 19, 1913. Serial No. 768,538.

*To all whom it may concern:*

Be it known that I, ARTHUR BEIJER, a subject of the King of Sweden, residing at Stevens Point, in the county of Portage and State of Wisconsin, have invented certain new and useful Improvements in Power Transmission and Control, of which the following is a specification.

My invention relates to power transmission and has particular reference to hydraulic transmission of power from a prime mover to a motor, or to a series of individual and substantially independent motors.

The object of the invention is to provide a simple, effective and easily controlled hydraulic transmission adapted for self-propelling vehicles as well as for numerous other uses. To this end the present transmission permits the prime mover in the form of the usual internal combustion engine, or series thereof, of an automobile to run at a constant speed, while a series of hydraulically driven motors for the wheels of the machine may be controlled at will as to their speed or power from zero to their maximum capacity, their direction of movement reversed, and any desired braking force applied in either direction of movement. This is accomplished by means of a simple and novel pumping mechanism driven by the prime mover, a series of novel motors driven by hydraulic pressure, and a novel and very simple controlling valve whereby the fluid's direction of motion and volume of flow, or degree of pressure on the motors, is controlled.

Another object of the invention is to provide a fluid-pumping or forcing mechanism that is subject to variation to any desired degree—between zero, or total inaction, and its maximum capacity without disturbing the prime mover.

With the above, and such other objects as will appear hereinafter, in view, my invention consists in the novel construction of hydraulic transmission, combination and arrangement of parts, all as hereinafter described in detail, illustrated in the accompanying drawings and incorporated in the appended claims.

Figure 3:
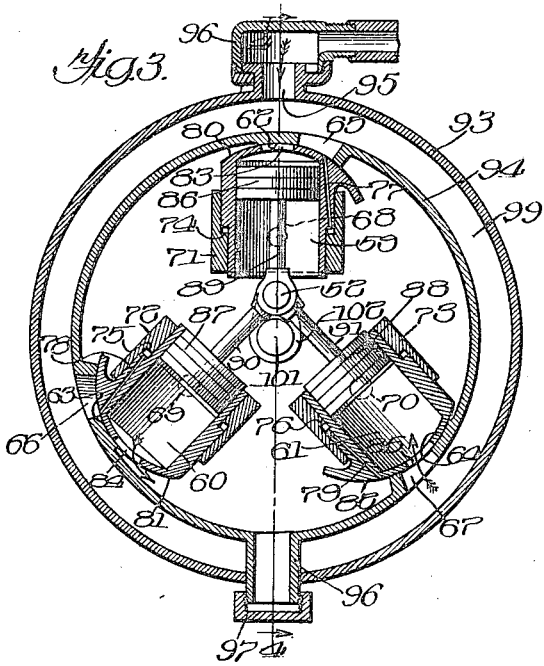
Figure 4:
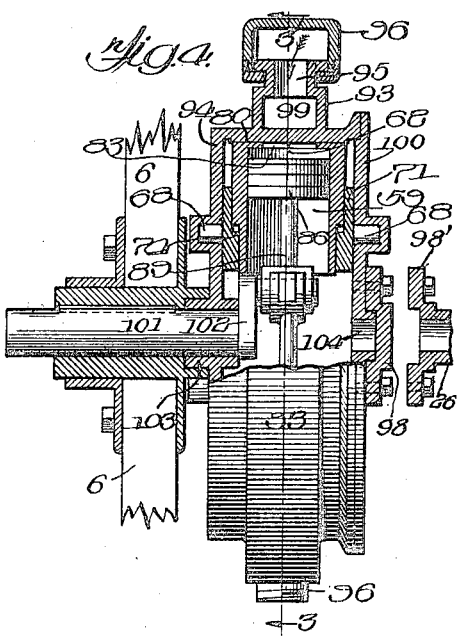
Figure 5:
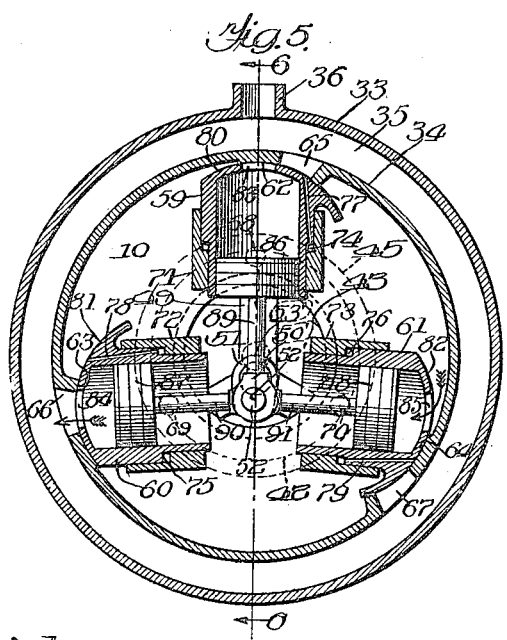
Figure 6:
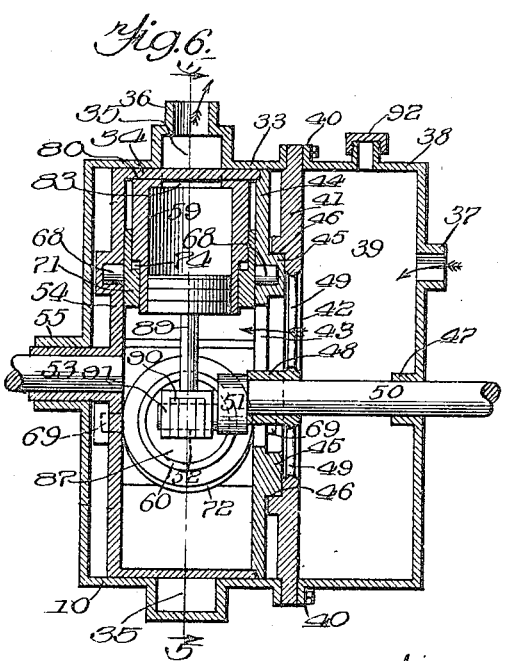

In the drawings—Figure 1 is a top plan view of the running gear of a self-propelled vehicle with my invention applied thereto. Fig. 2 is a side elevation of same partly in section. Fig. 3 is a side elevation in section taken substantially on line 3—3 of Fig. 4 of one of the individual vehicle wheel motors embodying my invention. Fig. 4 is a section taken substantially on line 4—4 of Fig. 3. Fig. 5 is a vertical section of the pump, taken substantially on line 5—5 of Fig. 6. Fig. 6 is a section taken substantially on line 6—6 of Fig. 5. Fig. 7 is a view of the controller valve and a section thereof taken substantially on line 7—7 of Fig. 8, the section line removing merely the housing to show the valve-core in full. Fig. 8 is a section taken substantially on line 8—8 of Fig. 7. Fig. 9 is a view similar to Fig. 8 showing the valve core and its passage in a different position. Fig. 10 is a section through the valve casing leaving the valve core intact, this section being taken substantially on line 10—10 of Fig. 8. Fig. 11 is a broken away and enlarged detail taken from Figs. 1 and 2 and represents a longitudinal section through one of the two ball joints through which the fluid is conducted to and from the motors, these joints being substantially flexible sections of the fluid conduit pipes between the controller valve and the wheel motors. Fig. 12 is an end elevation of the support for front wheels of the vehicle, showing the fluid conduits to and from the forward motors, this wheel support or frame being hollow members which serve as pipes or conduits. Fig. 13 is a broken away detail.

Referring in detail to the several views, and, first, to the general plan of the transmission system as disclosed in Figs. 1 and 2, 2 represents the usual spring-supported frame carried upon the wheel axles in the usual construction and serving to carry the tonneau or body, (not shown). The details of the support for this frame are not shown as they are immaterial for the purposes of the present invention. The ordinary explosion engine carried by this frame is represented by cylinders 3, 4 and 5 and the vehicle wheels are designated at 6, 7, 8, and 9, the latter two being the front wheels. A fluid forcing pump 10 connected through a pipe 11 with a controller valve 12, all within a casing 13, are mounted in any suitable manner on the frame 2. From the controller valve 12 the fluid passes through a short pipe 14 into an annular space 15 of a section of conduits having at its ends ball joints 16 and 17, both substantially identical and represented in section on an enlarged scale in Fig. 11. From the space 15 the fluid passes to rear wheel motors 18 and 19 through pipes 20 and 21 and to forward motors 22 and 23 through pipes 24 and 25. The return of the fluid from rear motors to pump takes place through a hollow axle 26 (which is a fixed part connecting motor-casings 18 and 19 rigidly) from which leads a pipe 27 into an inner ball joint space 28. From the latter the fluid passes back into the valve 12 through a short pipe 29 and from the valve the fluid returns to the pump through a pipe 30. The return circulation from the front motors is similar, namely, through what may, for the sake of comparison, be termed a hollow front axle 31, from the middle of which leads a pipe 32 into the ball jointed section's inner conduit or space 28, the latter, as already explained communicating with the valve 12 through the short passage 29 and thence through the pipe 30 back into the pump 10. The details touching the manner of connecting the pipes 20, 21, 24, 25, and 31 with the motor casings 18, 19, 22 and 23 may be varied in numerous well known ways and do not constitute specific parts of the present invention. In Fig. 12 the pipes 24, 25 and 31 have their ends swiveled to the motors 22 and 23, the swivel joints being, of course, hollow to permit the passage of fluid into and from the motors, because the front wheels must turn, while the rear motor connections for pipes 20 and 21 and axle 26 may be rigid, or substantially so. As the frame 2 is usually mounted on springs resting on the front and rear axles, or their equivalents in the present invention, the ball joints 16 and 17 are provided to provide responsive flexibility in the fluid conduits where they are connected with the pump 10 and its controller valve 12.

The enlarged detail Figs. 3 to 10 both inclusive deal with the pump, motor and controller valve mechanism by means of which the above-described circulation of fluid is controlled for forward and backward propulsion, braking, disconnecting the pump and motors from their fluid-connection, etc. Referring, now, in detail to the pump represented in Figs. 5 and 6, which are chiefly distinguished from Figs. 3 and 4 representing the motor for each of the wheels, in that in Figs. 5 and 6 the inner casing carrying a series of cylinders, revolves about a stationary crank, while in Figs. 3 and 4 the crank revolves and the inner casing is stationary. In Figs. 5 and 6 the pump 10 has an outer stationary casing 33 and an inner rotating casing 34. Between the two casings is an annular space 35 which is provided with a hollow hub 36 that connects with the pipe 11 in Figs. 1 and 2. The fluid is admitted into the inner casing 34 by way of a hollow inlet hub 37 on a casing 38 in which is a chamber 39. On the casing 38 is a flange 40 that is bolted or otherwise secured to a projecting edge of a plate or partition wall 41 which forms one side of the stationary casing 33, and has an opening 42 therethrough leading into a like opening 43 which leads into the interior of the inner casing 34. The opening 43 is in a removable plate or side 44 of the revoluble casing 34, and on the plate 44 is an annular flange 45 which rotates in a groove or channel 46 in the plate 41 and serves as the bearing for one side of the rotatable inner pump casing 34. On the casing 38 is a hollow hub 47 and on the plate 41 is a like hub 48 supported on a web 49 spanning the space or opening 42. In these hubs is secured or keyed a shaft 50 on the inner end of which is keyed a crank 51 having a wrist pin 52. The casing 34 is rotated by a shaft 53 secured to the opposite side 54. This shaft has a bearing in a hollow hub 55 formed on the stationary outer casing 33 surrounding the pump. The shaft 53 is driven from the driving shaft of the prime mover indicated in Fig. 2 at 56, which shaft 56 carries a pinion 57 meshing with a gear wheel 58 that is keyed on the shaft 53.

Within the rotary casing 34 are mounted a series of cylinders 59, 60 and 61, the number of which is not restricted by the nature of the invention to the three shown. On the inside wall of the casing or housing 34 are formed curved seats 62, 63 and 64 through which and the housing are cut ports 65, 66 and 67. The cylinders are caused to oscillate on trunnions 68, 69 and 70 formed on rings 71, 72 and 73 which girdle the cylinders and support them for limited longitudinal movement. These trunnions are, as shown in Fig. 6, mounted in recesses formed in the opposite vertical walls of the housing 34 which are designated by 44 and 54. The wall 44 is a removable wall of the casing to permit the mounting of the cylinders. The rings 71, 72 and 73 have each two different internal diameters and the external diameters of the cylinders are formed as shown in Fig. 5 to fit into the rings and provide opposing shoulders on rings and cylinders between which are formed annular spaces 74, 75 and 76. These spaces are brought into communication with the ports 65, 66 and 67 through bores 77, 78 and 79 in the respective cylinders. The outer ends of the cylinders are formed with curved ends 80, 81 and 82 which correspond to the curvatures of the housing seats and are concentric with the trunnions 68, 69 and 70. In these curved cylinder ends are ports 83, 84 and 85 which are successively oscillated into and out of register with the housing ports 65, 66 and 67 by means of pistons 86, 87 and 88 and piston-rods 89, 90 and 91 connected with the wrist pin 52 of the crank, when the housing and its cylinders are rotated about the stationary crank and wrist pin by the shaft 53. The throw of the pistons, and consequent capacity or power of the pump, is variable to the minutest extent by adjustment rotation of the shaft 50 and its crank 51, the shaft 50 to be turned by any suitable lever connection with the operator's seat or position. It will be noticed by reference to Fig. 6 that the shaft 50 is eccentric to the axis of rotation of the housing, or, in other words, to the axis of the shaft 53. By mounting the shaft 50 one-half the throw of its crank out of center of shaft 53 the wrist pin 52 may be turned into a position where said wrist-pin will be exactly concentric with the shaft 53, in which position the rotation of the inner casing or housing 34 would impart no movement to either the pistons or the cylinders. From such zero position the crank is adjustable out of center with the shaft 53 to any desired degree up to the maximum throw of the crank, which in the case of the stationary crank means the length of piston movement.

From the above-described mounting of the cylinders against their curved seats it will be seen that the cylinders themselves in coöperation with the housing seats, serve as valves and provide an accurate and dependable valve action wherein lost motion is substantially wholly eliminated.

In Fig. 5 53' represents the center or axis of the shaft 53; 50' is the axis of the shaft 50 and 52' the axis of the wrist pin 52, while the dotted line from 52' to 53' indicates the full adjustment throw of the crank 51 or its pin 52.

The pump receives the fluid from the system within its housing 34 and discharges it into the space 35 and thence out of the pump through the outer casing at 36 in the manner indicated by the arrows in Figs. 5 and 6. As previously explained the pipe 11 in Figs. 1 and 2 connects the hub 36 with the controller valve 12 and from the latter the fluid proceeds to the motors and is returned to the valve 12 at 14 and to the inlet 37 (Fig. 6) through the pipe 30 (Figs. 1 and 2) which pipe connects the controller valve with the hub 37. The system, including pump, motors and piping, may be filled in any suitable manner, as, for instance, by the capped opening 92 on the pump chamber 38.

One of the four motors shown in Figs. 1 and 2 is shown on an enlarged scale in Figs. 3 and 4. So far as the cylinders and their valve seats are concerned the construction of Figs. 3 and 4 is the same as that shown in Figs. 5 and 6. The motor has a stationary outer casing 93, an inner casing or cylinder housing 94 with arrangements the same as in Figs. 5 and 6. The housing 93 has a hollow hub inlet port which is shown with a coupling connection 96 attached to a section of pipe 20. The details of such connection are, however, not essential to the operation of the invention and may be varied in numerous ways. Diametrically opposed to the hub 95 is a hub 96 which extends from the inner casing or housing 94 through the outer casing 93 with which connection may be made with the axle conduit 31 shown in Fig. 12. In Fig. 3 this hub is closed by a cap 97 to adapt the casing for the rear wheel connections where the return flow takes place through the center of the motor instead of at the hub 96. In Fig. 4 the central, or axle, passage leading from the interior of the housing is closed by a cap 98 to adapt the motor for the front (Fig. 12). The annular space between the outer casing and the motor housing (99) is substantially the same as the space 35 in the pump, and, likewise, the removable wall 100 of the motor is similar to the wall 44 of the pump in function and arrangement.

The motor shaft carrying the crank for the cylinders is designated as 101 and the crank as 102. The shaft 101 has its bearing in a hub 103 which projects from the motor housing 94. To this shaft the wheel of the vehicle, designated as 6 in Fig. 4, or as one of the four shown in Figs. 1 and 2, is keyed or secured in any suitable manner. Opposite the shaft is a central port 104 which is shown closed by the cap 98. Adjacent to the cap is shown a section of the rear axle 26 with a flange 98' identical to the flange on the cap. By substituting the flanged end for the rear axle for the cap 98 said rear axle is made the return conduit for the rear motors as explained in connection with the initial description of Figs. 1 and 2. However the connection of the rear axle with the motors, whether this axle be an integral part of the plate 100, or mounted in any other way,—it not a detail that is essential to this invention, so far as any particular form of connection is concerned, and the arrangement shown is merely for the purpose of illustrating the adaptability of the motor shown in Figs. 3 and 4 to any of the positions on the vehicle.

The controller valve 12 is shown on an enlarged scale in Figs. 7, 8, 9 and 10. This consists of a tapered cylindrical casing designated as 12 on the large end of which is a removable cover 105 having therein a bearing recess 106 for one end of a coreshaft 107 on a core 108. The other end of this shaft has a bearing in a hollow hub 109 on the small end of the casing. On the projecting end of the shaft is keyed an arm or lever 110 shown in Fig. 1 by means of which the core 108 is turned to register a cored out passage 111 with a series of inlet and outlet ports 112, 113 and 114 passing through hubbed portions of the casing as shown in Figs. 8, 9, and 10. Adjacent to the opening 112 is another similar opening 115 which is always open to spaces 116 and 117 above and below the core 108 and which spaces are open to each other through vertical spaces 118 and 119 (Fig. 8) on opposite sides of the core. Through the core passage 111 two of the ports 112, 113 and 114 may be connected with each other. In Fig. 9 the ports 112 and 114 are made substantially a continuous part of the passage 111. The positions of the hubbed ports 112, 113 and 114 relative to the conduit pipes leading to and from the valve are all indicated in Fig. 2 by these port numbers. The position of the valve port 115 is indicated in Fig. 1 by the numeral 115 as at the lower end of the pipe 30. In view of the foregoing descriptions Fig. 2 shows that 112 is the inlet port from the pump, 114 the outlet port into the pipes 20, 21, 24 and 25, and 113 the return inlet port into the valve from the return pipes 27 and 32 and Fig. 9 shows the valve core adjusted for such a course of movement of the fluid, which may be called the full power forward movement during which the fluid flows from port 112 to and out of port 114 through the passage 111 and returns into the valve through the port 113 whence it passes around the core 108 into the outlet 115 and into the pump via the inlet 37. By turning the core 108 so that its passage 111 will register with the openings 112 and 113 the movement of the fluid will be reversed and the motors caused to run in the opposite direction. In the latter event the outgoing pipes will be 27, 32, 26 and 31 and the return pipes 20, 21, 24 and 25, and in Fig. 2 113 will be the outlet and 114 the inlet to the valve 112. This reverse position of the valve is shown by dotted lines in Fig. 9, referring to the position of the valve core shown in Figs. 8 and 10. In this position the circulation of the fluid between pump and valve in the one instance and between valve and motors in the other takes place. In other words the circulation is divided into two independent circuits. The circuit between pump and valve will be from the pump to the valve through port 112 and from the valve back to the pump through the port 115. The circuit between valve and motors will be via the valve ports 113 and 114. In other words the vehicle is free to coast independently of the operation of the pump, the pump-actuated fluid being short-circuited, while the cut-off portion of the full circuit—that between valve and motors—is free of the pump and flows idly under such impetus as the motors give it as an independent circuit.

Modification of the speed of the vehicle or motors from either "full steam ahead" indicated by the full line position of the passage 111 in Fig. 9 or full power backward movement indicated by the dotted lines in the same figure, is accomplished by adjusting the valve to let only a portion of the fluid traverse the full circuit and letting the remaining portion follow the short circuit, or return to the pump. This division of the full hydraulic pressure is accomplished in the manner indicated by dotted line position of passage 111 shown in Fig. 8. In this position the valve directs a portion of the fluid entering at 112 into 111 and 114 and the remaining portion into the spaces surrounding the core and thence into the return outlet from the valve 115. The valve is also utilized as a substantially certain brake with any desired degree of dependable force, by interposing closer parts of the core partially or wholly in front of the ports 113 or 114. The ends of what may be termed the solid part of the core are utilized for this purpose and are designated as 120 and 121, the latter, looking at Fig. 8, being used to brake, say, a backward movement while the former serves as a forward movement brake. In turning the core from one position to another these braking portions would cause unintentional braking and to obviate such unintentional braking a pair of puppet valves are provided each of which acts automatically to provide relief against unintentional blocking of the circuit while the braking portion passes a port. Looking at Fig. 9 the core cannot be turned to change the flow from 112 to 114 to 112 to 113 without momentarily interposing the imperforate or solid portion or end 121 as a closer for the port 114. If 114 is closed a partial vacuum will be produced between this port and the motors, assuming that the course of the flow makes the port 114 an outlet port of the valve. Relief against such a vacuum is provided in a puppet valve 122 which has its seat in a circular depression in the end 121 of the so called solid part of the core. A similar puppet valve 124 is seated in the bottom of a recess or depression 125 in the solid end 120. The recesses 123 and 125 are connected by a bore 126 which contains stems 127 and 128 for the valves 124 and 122, respectively. On the stem 128 is a yoke or forked member 129 into which the stem 127 slides freely. On the yoke or fork are inturned lugs, or their equivalent, 130 against which one end of a compression spring 131 bears while the opposite end of this spring is secured to the end of the stem 127. The spring thus tends to draw the puppet valves toward each other, or, in other words, hold the valves against their seats.

It will be noticed by reference to Fig. 8 that the bore 126 intersects the space 119, hence when suction takes place through the port 114 the atmospheric pressure back of the valve 121, or in the space 119, will force the valve 122 outwardly thus opening a passage from 119 to 114 through the bore 126. If the valve core is turned to bring its passage 111 from its dotted line position in Fig. 9 to its full line position the part 120 will be interposed before the port 113 and like relief will be afforded by the valve 124, the course of the flow and the suction being in this instance from the port 114 to and through the port 113. In each instance the relief valve acts when the rear face, or stem side of the valve, faces the current. The opposite face of each of these valves together with the faces of 120 or 121, as the case may be, serves as a brake by being interposed against the current. Closing the port 113 entirely by the closer portion 120 of the core would effect a sudden stoppage of forward movement, and the closing of port 114 in like manner would suddenly stop a backward movement, assuming that the direction of rotation of each motor is such as to make the outflow from the valve to the motors at 113 and the inflow from the motors to the valve at 114.

The arrows in Figs. 1 and 2 indicate the course of the circulation during one direction of movement of the pump and motors, and a reversal of the flow between controller valve and motors would reverse the directions indicated by said arrows. The speed of currents through the motors may be modified either by short-circuiting a part of the flow through the controller valve or by shortening the strokes of the pump cylinder pistons. Such shortening of pump strokes would tend to speed up the engine or prime mover and increase the power for hill-climbing purposes. Where this hydraulic power system is used to run a number of independent machines each machine would be provided with its own controller valve and through it control the direction, volume or speed of flow for the individual motor provided for such machine.

In neither of the valve core positions will the circuit between the pump and valve be blocked as the port 112 is always open to the passage 111 when it registers with either port 113 or port 114 and when it does not so register the port 112 is either partly or wholly open to the outlet 115. When only partly open to the latter the remainder of the outlet is found through the passage 111 and either the port 113 or the port 114. As the braking is effected by interrupting the flow between the controlling valve and motors no strain is thrown on the power plant or pressure on pump and, as shown, the wide range of variations may be effected by small movements. The size of each cylinder port is made slightly less than one-third of the arc of its oscillation so that it will register alternately with the cylinder closing portion of the valve seat, the valve seat port and the inside of the housing.

The inner ends of the cylinders within their mounting rings are acted upon by the fluid admitted into the annular spaces between said ends and rings to hold the curved valve ends of the cylinders closely against their seats, the surface area of said inner ends being slightly in excess of the cylinder valve seat area exposed to pressure from the space around the cylinder housing. The pump takes its motive fluid from within the cylinder housing while the motors take theirs from without the housing, as indicated by the arrows in Figs. 3 to 6, and discharge into the housing.

In the annular spaces 74, 75 and 76, between the shoulders formed between the cylinder and its encircling ring in each instance, may be inserted a series of springs to assist the pressure in said spaces in holding the cylinders against their seats. Fig. 13 shows an enlarged section of a cylinder and ring with a spring 74' inserted between the cylinder and ring to indicate the spring pressure arrangement.

Having thus described my invention, I claim as new and desire to secure by Letters Patent—

1. In a pump, the combination with a rotatable casing having ports therein, of a series of oscillating cylinders which serve as valves for said ports, a stationary and eccentrically mounted crank shaft with which the pistons of said cylinders have crank connection, said crank shaft being rotatably adjustable to move the crank connections with said pistons into various degrees of eccentricity relative to the axis of said casing.

2. A pump consisting of a rotatable casing having ports therein and a series of radially arranged cylinders having oscillatory movements which control said ports, the piston rods of said cylinders being connected with the wrist-pin of a stationary crank that is adjustable to move said wrist-pin from concentricity to eccentricity relative to the axis of rotation of said casing.

3. A variable speed gear comprising a rotary, oscillating cylinder pump and an oscillating cylinder motor having valve-controlled fluid connections, and each having piston connection with a single crank shaft, the crank shaft of the pump being stationary and eccentric to its axis of rotation and adjustable to vary its crank throw.

4. In a variable speed gear, a rotatable pump casing having ports and radially arranged cylinders controlling said ports, a pivot to which the pistons of said cylinders are connected, means for moving said pivot from concentric to eccentric relation to the axis of the pump's rotation, a motor having similarly incased and arranged cylinders, but whose casing is stationary, said cylinders having crank connection with the motor shaft, and valve controlled conduits between said pump and motor ports.

5. The combination with a rotatable casing provided with fluid inlet and outlet ports, of a series of radially arranged and oscillating pump cylinders which control said ports, an eccentrically mounted stationary shaft, a crank fixed on said shaft and having wrist-pin connection with the cylinder pistons, said wrist pin being adjustable toward and from the axis of rotation of said casing.

6. In a variable speed gear, a rotary and oscillating cylinder pump having a plurality of cylinders connected with and rotatable about an eccentrically arranged stationary crank shaft to the crank of which the pistons of said cylinders are connected, said crank being adjustably rotatable, an oscillating cylinder motor having its pistons connected with the crank of a rotating shaft, and valve-controlled fluid connections between said pump and motor.

7. The combination with a driving shaft and a driven shaft, of a pump consisting of a casing rotated by said driving shaft and having ports therein together with a series of radially arranged cylinders constructed, arranged and operating to control said ports and provided with means for varying the lengths of piston strokes from immovability to the maximum length of stroke, and a motor consisting of a similar, but stationary, casing having similarly arranged and acting cylinders therein whose pistons are arranged to rotate the driven shaft, motor fluid conduits connecting said pump and motor, and a valve controlling the volume and direction of flow of fluid through said conduits.

8. A variable speed gear comprising a driving element consisting of a rotary oscillating cylinder structure having a plurality of oscillating cylinders and coöperating pistons therein acting as a pump, a driven element consisting of a stationary oscillating cylinder structure adapted to be connected to a driven device and having a plurality of oscillating cylinders and coöperating pistons therein acting as a motor, the fluid connections between the pump and the motor, and means for altering the power capacity of the pump.

9. The combination with a stationary casing, of a housing mounted to rotate within said casing, a passage for a driving fluid between said casing and housing, ports in said housing leading from said passage to the interior of said housing, cylinders mounted for oscillatory movement and controlling said ports, said cylinders having corresponding ports adapted to register with the housing ports, a relatively fixed crank eccentrically disposed with reference to the axis of rotation of said housing, means for adjusting said crank pin toward and from said axis, pistons for said cylinders, piston-rods pivoted to said crank, and means for rotating said housing and thereby oscillating said cylinders about said axis.

10. The combination with a housing, of cylinders within said housing, an annular passage in said housing having ports leading to said cylinders, ports for conveying fluid into and from said passage and housing, respectively, pistons for said cylinders, a valve mechanism for said cylinders which consists of the co-action of said cylinders and housing, means for actuating said cylinders and pistons, and means for varying the length of stroke of each of said pistons.

In testimony whereof I have hereunto set my hand in the presence of two subscribing witnesses.

ARTHUR BEIJER.

Witnesses:
E. V. E. ATWELL,
H. G. HARRIMAN.